Oct. 31, 1972    R. REITZ    3,701,570
SINGLE RELEASE AIR BRAKE FOR RAILROAD VEHICLES
Filed June 14, 1971
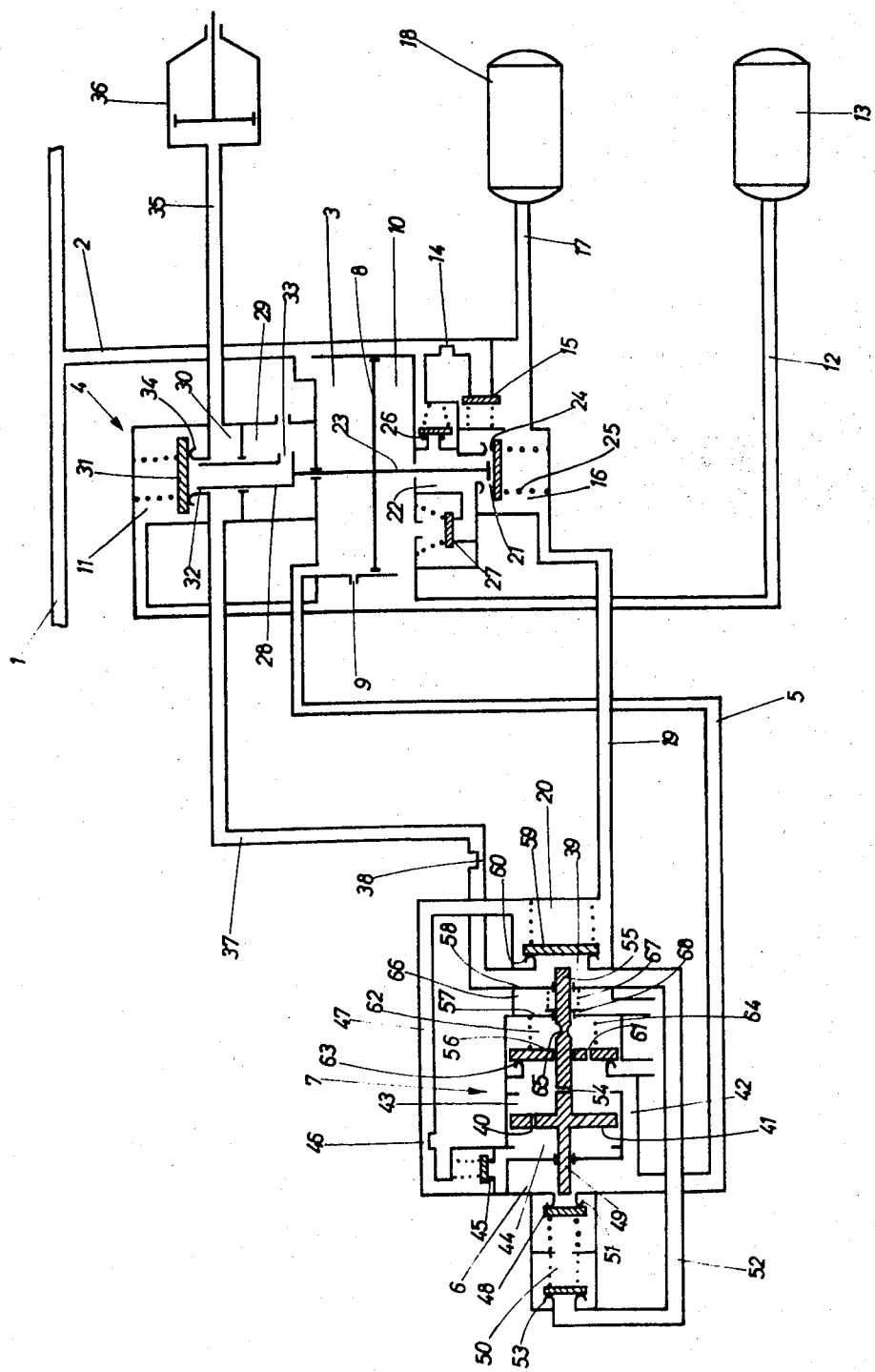

3,701,570
SINGLE RELEASE AIR BRAKE FOR
RAILROAD VEHICLES
Reinhard Reitz, deceased, by Gertrud Reitz, legal representative, Munich, Germany, assignor to Knorr-Bremse G.m.b.H., Munich, Germany
Filed June 14, 1971, Ser. No. 152,683
Claims priority, application Germany, June 15, 1970,
P 20 29 408.0
Int. Cl. B60t 15/52
U.S. Cl. 303—70                                        4 Claims

ABSTRACT OF THE DISCLOSURE

A single release air brake for railroad vehicles has a double-pressure regulating valve connected between a brake cylinder and the main air line. First and second auxiliary air reservoirs are also connected to the regulating valve. A single structural unit comprising a rapid braking accelerator and a switching device is connected to the regulating valve and through the regulating valve to the brake cylinder and to the second auxiliary air reservoir. The structural unit has a control piston and a valve piston displaceably mounted therein and having an abutment coupling therebetween. These pistons, in response to decreases in pressure in the main air line, operate valves which connect the first auxiliary reservoir to the braking cylinder upon a small lowering of pressure in the main air line occurring during operational braking. For rapid braking action, valves are opened in the unit to open the main air line to the atmosphere to quickly empty the main air line. The regulating valve is provided with a device for quickly refilling the second auxiliary reservoir from the main air line after a rapid braking operation.

---

The present invention relates to an air braking system for railroad vehicles, more particularly, to a single release air brake incorporating both a rapid braking accelerator and a switching device into a single structural unit.

A single release air brake system for railroad vehicles has been proposed wherein a brake cylinder is controlled by a double-pressure regulating valve in connection with a rapid braking accelerator. A first auxiliary air tank is connected to the regulating valve to control the regulating valve with its pressure therein and a second auxiliary tank is also connected to the regulating valve and becomes effective during a rapid braking operation. The rapid braking accelerator has a slidable piston therein with one side of the piston being subjected to the pressure of the main air line and the other side to the pressure in a control chamber. The control chamber is connected to the main air line by an orifice in the piston and is connected to the second auxiliary air tank through a checck valve. Also within the rapid braking accelerator is a valve piston which has one side subjected to the pressure of the main air line and the other side directed to a chamber which is connected to the main air line by means of an orifice in the valve piston. A valve member having a very small cross section is actuated in response to movement of the valve piston to open the chamber to the atmosphere when the control piston is subjected to a pressure in the control chamber greater than the pressure in the main air line. The valve piston also opens a large cross section valve to open the main air line to the atmosphere.

A switching device is provided which has a piston one side of which is subjected to the pressure in the control chamber of the rapid braking accelerator and the other side directed to the pressure in the main air line. This switching device piston opens a shut off valve positioned in a connection leading from the brake cylinder to the main air line and controlled by a check valve when the pressure in the main air line is predominant. This switching device piston also opens a valve connecting the second auxiliary air tank to the brake cylinder during a rapid braking operation at which time the pressure in the control chamber predominates over the pressure in the main air line.

In such an air brake the rapid braking accelerator and the switching device are constructed as two separate components that must be connected to the double-pressure regulating valve, the auxiliary air tanks and to each other by a number of connecting lines. Since a large number of connecting lines are required, costs for the construction and assembly of the single release air brake and expenses for servicing and maintenance are substantially increased. Further, the necessity for constructing two separate components significantly increases the manufacturing costs and the overall weight of the air brake assembly.

It is therefore the principal object of the present invention to provide a novel and improved single release air brake for railroad vehicles.

It is another object of the present invention to provide a single release air brarke for railroad vehicles of the type described above which requires a minimum number of connecting lines and individual parts, which is simple and inexpensive with respect to the assembly and servicing, and which requires less manufacturing costs and is of lower weight than such previously known air brakes.

The objects of the present invention are achieved and the disadvantages of the prior art are eliminated by the present invention which essentially combines the rapid braking accelerator and the switching device into a single structural unit having a common control piston for both the accelerator and the switching device. The control piston is subjected to the pressure in the main air line in opposition to pressure in the control chamber.

According to one aspect of the present invention there is disclosed a single release air brake for railroad vehicles in which a double-pressure regulating valve is connected to a brake cylinder and to a main air line with first and second auxiliary air tanks being connected to the regulating valve. The structural unit which combines the rapid braking accelerator and the switching device has a control piston with an orifice therein to define a control chamber and a first chamber on opposite sides thereof. The first chamber is connected to the main air line and the control chamber communicates with the air line through the orifice in the piston. Means which may include a check valve connect the control chamber to the second auxiliary tank. A valve piston has an orifice therein with one side of the piston being exposed to the pressure in the main air line and the other side to a second chamber. Means are operable by the valve piston to connect the main air line to the atmosphere when the pressure in the main air line is greater than the pressure in the second chamber. Valve means are operated by the valve pressure in the piston to open the first chamber to the atmosphere when the main air line and the first chamber is greater than the pressure in the second chamber. Means which may include a check valve connect the brake cylinder to the main air line. Valve means are provided in the brake cylinder connecting means operable by the control piston for opening and closing the connecting means when the pressure in the main air line is greater than the pressure in the control chamber. There are also provided means including second valve means for connecting the second auxiliary air tank to the brake cylinder. The second valve means is actuated to its open position by the valve piston during rapid braking operation when the pressure in the control chamber is greater than the pressure in the first chamber and the main air line.

Other objects and advantages of the present invention will be apparent upon reference to accompanying description when taken in conjunction with the drawing which illustrates schematically the single release air brake according to the present invention.

With reference to the drawing a specific embodiment of the present invention will be described in detail.

As may be seen in the drawing, a main air line 1 is connected by a branch line 2 to a line chamber 3 in a double-pressure regulating valve 4. The line chamber 3 communicates through a pipe line 5 with a chamber 6 in a component generally indicated at 7 and constructed as a switching device. The line chamber 3 is also connected to a control chamber 10 and a further chamber 11 in the regulating valve 4 through an orifice or nozzle 9 over which slides a piston 8 that defines a surface of the chamber 3. The control chamber 10 exerts a pressure on the piston 8 in opposition to the pressure exerted thereon from line chamber 3.

A pipe line 12 connects the line chamber 3 to a first auxiliary air reservoir 13.

The branch line 2 is connected through a throttling orifice 14, through a check valve 15 in to a chamber 16 of the regulating valve 4 which is connected to a second auxiliary air reservoir 18 through a pipe line 17. The chamber 16 is connected through a pipe line 19 to a chamber 20 in the switching device unit 7. The chamber 16 in the regulating valve 4 is separated from a chamber 22 therein by means of a shut off valve 21. The piston 8 is provided with an axially extending stem 23 which urges the shut off valve 21 open against the force of a spring 25 by means of an abutment coupling 24 when the piston 8 is in its lowermost position as illustrated in the drawing. The chamber 22 is connected to branch line 2 through check valves 26 and 27 to control the chamber 10. The throttle orifice 14, shut off valve 21 and stem 23, check valves 15, 26 and 27 constitute a device for filling the second auxiliary air reservoir 18 from the main air line 1 through the branch line 2.

The piston 8 also carries a valve tube 28 which extends coaxially therefrom opposite in direction to the stem 23. The valve tube 28 is slidably and sealingly mounted for displacement within a chamber 29 having an opening therein communicating to the atmosphere. The upper end of the valve tube 28 defines a valve seat 32 within a chamber 30 and is engageable with a spring loaded double sealing plate or valve 31. The interior of the valve tube 28 communicates constantly with chamber 29 through a transverse bore 33. The double sealing plate 31 engages a valve seat 34 fixed to the housing of the regulating valve 4 to define a valve which controls the connection between chambers 11 and 30.

A pipe line 35 connects the chamber 30 to a brake cylinder 36. The chamber 30 is also connected by a pipe line 37 having a throttling orifice 38 therein to a chamber 39 of the structural unit 7.

The structural unit 7 comprises a control piston 41 having an orifice 40 therethrough with one side of the piston defining a wall of a chamber 43 communicating through a duct 42 with the chamber 6. The other side of the control piston 41 is exposed to a control chamber 44 positioned adjacent but separated from chamber 6. The control chamber 44 is connected to the chamber 20 by a line 47 having a check valve 45 and an orifice 46 therein. The control piston 41 is provided with an axially extending stem 49 which terminates in the chamber 6 in front of a spring-loaded valve plate 48. The valve plate 48 is disposed in a chamber 50 and, together with a valve seat 51 attached to the housing of unit 7, constitutes a shut-off valve 48, 51 to control the connection between chambers 50 and 6 and actuated by the stem 49.

From the chamber 39 in the unit 7 a duct 52 is connected to the chamber 50 and has a check valve 53 therein.

On the side of the control piston 41 away from the stem 49 there is provide an abutment coupling 54 disposed in the chamber 43 and operatively engageable with a valve piston 56 having a stem 55 extending axially therefrom. The valve piston stem 55 is displaceable in a sealed relationship through two partitions 57 and 58 fixed to the housing of unit 7 and the stem 55 terminates in chamber 39 in front of a spring-loaded sealing plate 59. The sealing plate 59 together with a valve seat 60 fixed to the housing of unit 7 constitutes a valve 59, 60 for controlling a connection between the chambers 39 and 20.

The valve piston 56 has an orifice 61 therethrough and separates the chamber 43 from a chamber 62 the other side of which is defined by the housing partition 57. The valve piston 56 is engageable with a valve seat 63 fixedly mounted to the housing of the unit 7 to constitute an acceleration valve 56, 63 of a large cross sectional area for controlling an outlet from the chamber 43 to the atmosphere. A spring 64 positioned in the chamber 62 urges the valve piston 56 into the closed position.

Within the chamber 62 the valve piston stem 55 is provided with a constriction or smaller diameter portion 65. The constriction 65 together with the stem packing in the partition 57 constitutes a shut off valve 57, 65 for controlling the connection of chamber 62 with a chamber 66 located between the two housing partitions 57 and 58. The shut-off valve 57, 65 is opened when the valve piston stem 55 is displaced to the right as viewed in the drawing. The valve piston stem 55 carries a flange 68 located within the chamber 66 to limit the movement to the left of the stem by abutting on the housing partition 57 and urged to the left by a compression spring 67. The chamber 66 is always open to the atmosphere.

The drawing illustrates all of the components of the air brake in their respective positions when the air brake is released and in the operating condition. The piston 8 in the regulating valve 4 will be in its lowermost position, the orifice 9 will be released and valves 21 and 31, 32 are open. All of the remaining valves of the air brake are closed. With the exception of the chamber 30, pipe line 35, brake cylinder 36 and line 37, chamber 39 and duct 52, all of the spaces, chambers and tanks of the air brake as disclosed are subjected to the action of the normal pressure head from the main air line.

In order to initiate an operational or service braking action such as would occur during the normal operation of the railroad vehicle the pressure in the main air line 1 will be lowered. This lowering of pressure does not yet affect the pressure in the brake cylinder but there occurs a corresponding decrease of pressure in the line chamber 3 and through the pipe line 5 in the chamber 6 and over duct 42 in the chamber 43. The orifice 9 is so dimensioned that the pressure in control chamber 10 and in the first auxiliary air reservoir 13 will not decrease at the same rate. Accordingly, the pressure on the under-side of the piston 8 will be greater and the piston 8 will be lifted.

The orifice 40 in the control piston 41 is so dimensioned that upon a decrease of pressure in chamber 43 the pressure in the control chamber 44 will correspondingly decrease and accordingly the control piston 41 will remain stationary.

As the control piston 8 is lifted within the regulating valve 6, it will slide over the orifice 9 which will thus be closed. At the same time shut off valve 21 will be closed, the abutment coupling 24 will be released, valve 31, 32 will be closed and valve 31, 34 will be opened. Air under pressure will then flow from the first auxiliary reservoir 13 through line 12 and chamber 11 through open valve 31, 34, into chamber 30, and through pipe line 35 into the brake cylinder 36. At the same time, the chamber 39 in the switching device unit 7 will be filled with air under pressure through pipe line 37 and the chamber 50 of unit 7 will also be filled with air under pressure through the check valve 53. However, the switching position of the unit 7 will remain unchanged. As soon as the pressure in control chamber 10 decreases corresponding to the decrease of pressure in main air line 1 because of the consumption of air for the brake cylinder 36, the control piston 8 will be lowered to the position closing valve 31, 34. The components are now in the final braking position.

In order to subsequently release the air brake, the normal pressure head is again introduced into the main air line 1. This causes a pressure increase in the line chamber 3 which in turn will move the control piston 8 downwardly toward its lowermost position to open the valve 31, 32, open the valve 21 in response to the abutment coupling 24 and release the orifice 9. Simultaneously with these steps, the control piston 41 will be shifted toward the left by the increase in pressure in the chamber 43. This will release the abutment coupling 54 whereby the stem 49 will push open the valve 48, 51. However, since the pressure in the brake cylinder 36 and thus the pressure in front of the check valve 53 at the most equals the pressure prevailing in the main air line 1, the check valve 53 will remain closed and the opening of the shut off valve 48, 51 will have no consequences in the chamber 6.

With the opening of valve 31, 32 air under pressure will flow from the brake cylinder 36 through the valve tube 28 and chamber 29 to the atmosphere. The second auxiliary reservoir 18 will still be subject to the normal pressure head. Accordingly, air will flow through the opened shut off valve 21 into chamber 22 and through check valves 26 and 27 into the main air line 1 and into the first auxiliary tank 13 to bring about a rapid and powerful increase of pressure up to the equalization of pressure. The increase of pressure in this manner greatly facilitates and accelerates the release of the air brakes, particularly in the case of long trains. Subsequently, the normal pressure head is again introduced into the main air line 1 and all of the chambers connected thereto. Also, the normal pressure head is introduced into the auxiliary air reservoirs 13 and 18 after introducing of the air under pressure into the main air line 1.

When the operator of the train desires a rapid braking action such as would occur in an emergency, the main air line 1 is emptied into the atmosphere as quickly as possible. Upon the decrease of pressure in the main air line 1, the regulating valve 4 will operate as described above for a service braking operation. However, in the switching device 7, the pressure in control chamber 44 cannot be decreased through the orifice 40 at the same rate of pressure decrease occurring in the chamber 43 connected to the main air line. Accordingly, the control piston 41 will be moved to the right as viewed in the drawing and through the abutment coupling 54, the stem 55 will move against the force of the spring 67. The constriction 65 will reach the area of partition 57 and the shut off device 65, 57 will be opened. Air under pressure will then flow from chamber 62 through chamber 66 to the atmosphere. The pressure still remaining in the chamber 43 can still push the valve piston 56 to the right against the force of the spring 64. Accordingly, the acceleration valve 56, 63 will be opened to establish a large cross sectional connection between the chamber 43 and the atmosphere. As a result, the air still remaining in the main air line 1 will escape very rapidly to the atmosphere. In this manner there is obtained an extremely rapid and substantially complete emptying of the main air line 1.

The control piston 41 will be pushed still further to the right by the pressure prevailing in the control chamber 44 so that the stem 55 will push open the valve 59, 60. Air under pressure will now flow from the second auxiliary reservoir 18 through open valve 59, 60 and the orifice 38 into the brake cylinder 36 to establish an increased equalizing pressure between the two auxiliary tanks 13 and 18 and the brake cylinder 36. The flow of air from the auxiliary tank 18 is in addition to the flow of air from the auxiliary tank 13 to the brake cylinder 36 in the manner as described above.

The control chamber 44 in the switching device unit 7 is also emptied rapidly through check valve 45 and throttling orifice 46 to equalizing pressure. Subsequently the control chamber 44 is emptied gradually through the orifice 40 and the chamber 43. As soon as atmospheric pressure is at least approximately attained in chambers 43 and 44, springs 64 and 67 will urge valve piston 56 and stem 55 and, through abutment coupling 54, control piston 41 back into their initial positions. Valve 59, 60 and shut off device 65, 57 will thus be closed.

In order to subsequently release the air brakes after a rapid braking operation an increase in pressure will be introduced into the main air line 1. This results in a pressure increase in chamber 43 in unit 7 which urges control piston 41 to the left against the emptied control chamber 44 until the valve 41, 48 is pushed open by the stem 49. Air under pressure will then flow from brake cylinder 36, through pipe line 37, through throttle 38, duct 52, check valve 53 and chamber 50 through the open valve 48, 51 into chamber 6. From the chamber 6 air will flow through pipe line 5 into the line chamber 3 and then to the main air line 1. This produces a rapid pressure increase in main air line 1 up to the equalization pressure with the pressure values still prevailing in brake cylinder 36. Since valve 31, 34 is still open this pressure equalization will occur with the pressure prevailing in auxiliary tanks 13 and 18. Subsequently, check valve 53 will close and interrupt the connection between brake cylinders 36 and main air line 1.

Since the pressures will be equal on both sides of control piston 8, this piston will be pressed downwardly as a result of the closing force of valve 31, 34. A further pressure increase in main air line 1 and accordingly in line chamber 3 will lower the piston 8 to its lower-most position. As a result, valve 31, 32 will be opened and the residual pressure remaining in brake cylinder 36 can escape to the atmosphere through chamber 29. The downward movement of piston 8 will release orifice 9 and open shut off valve 21 by means of the abutment coupling 24. Auxiliary tank 13 will be filled through orifice 9 from line chamber 3 and the other auxiliary tank will be filled through the throttle 14 and check valve 15 in accordance with the pressure increase in main air line 1.

There will also occur a gradual increase in pressure in the control chamber 44 through the orifice 40. Upon the equalization of pressures between chambers 43 and 44, control piston 41 will be returned to the right to its abutment position against stem 55 and shut off valve 48, 51 will be again closed. When the normal pressure head is again reached in the main air line 1 and the several chambers directly connected thereto, including the auxiliary tanks 13 and 18 and the brake cylinder 36, the air brake will then be in its full release position.

It is pointed out that according to the present invention the control chamber in the switching device unit is connected with the second auxiliary air tank by means of a check valve which is positioned in a direct connection to the brake cylinder. This construction enables the switching device unit to be connected to the remaining components of the air brake by only three connecting lines. As pointed out above, this minimum number of connecting lines greatly facilitates servicing and assembly problems and decreases the costs of construction and maintenance.

The prior art air brake as described above employed a refill valve for the auxiliary air tank which was constructed as an individual structural unit. This unit thus required a number of additional pipe line connections to the other components of the air brake. According to the present invention such a refill device for the second auxiliary air tank is constructed integrally with the pressure regulating valve as illustrated in the drawing and described above. Such an integral construction of the refill unit rather than as a separate structural unit is particularly expedient since for the purpose of release acceleration, the two auxiliary air tanks are connected to each other not only toward the end of the release operation but also during a release operation of a long time duration.

It will be readily apparent that the air brake as disclosed herein can be adapted to particular conditions required in specific cases by the arrangement of additional devices. As further modifications, a release nozzle which may be switched to different positions may be positioned in the connection of the chamber 29 of the regulating valve to the atmosphere. Further, a filling impact protection device may be connected before the auxiliary air reservoir 13. Also, a release valve and/or a minimum pressure unit as well as a maximum pressure limiting device may be provided for the brake cylinder.

Thus it can be seen that the present invention discloses an air brake for railroad vehicles which incorporates all of the requirements considered necessary in a single release air brake. The present air brake guarantees an increased brake cylinder pressure in rapid braking operations, acceleration to the release position after a service braking operation by feeding air under pressure into the main air line and the first auxiliary air tank from a second auxiliary air tank and accelertion to the release position after a rapid braking operation by an equilazation of the pressure in the brake cylinder and the two auxiliary air tanks with the pressure prevailing in the main air line. In addition to incorporating a simply constructed refill device into the double-pressure regulating valve, the air brake of the present invention requires that the switching device component 7 is connected by means of only three pipe lines, namely 5, 19 and 37. As a result, the assembly and servicing of the switching device unit 7 has been greatly facilitated.

It is understood that this invention is susceptible to modification in order to adapt it to different usages and conditions and, accordingly, it is desired to comprehend such modifications within the invention as may fall within the scope of the appended claims.

What is claimed is:

1. In a single release air brake for railroad vehicles having a brake cylinder, a double-pressure regulating valve connected to the brake cylinder and to a main air line, and first and second auxiliary air reservoirs connected to the regulating valve, the improvement of a rapid braking accelerator and a switching device combined into a single structural unit comprising a control piston with an orifice therein and defining a control chamber and a first chamber on opposite sides thereof, first chamber being connected to the main air line and said control chamber communicating with said main air line through said piston orifice, means for connecting said control chamber to the second auxiliary reservoir, a valve piston having an orifice therein with one side of the piston being exposed to said first chamber and defining a second chamber on the other side thereof, means operable by said valve piston for opening said second chamber to the atmosphere when the pressure in the main air line and the first chamber is greater than the pressure in said second chamber, valve means operable by said valve piston for opening said first chamber to the atmosphere when the pressure in the main airline and the first chamber is greater than the pressure in the second chamber means including a check valve for connecting the brake cylinder to the main air line, valve means in said brake cylinder connecting means operable by said control piston for opening and closing said connecting means when the pressure in said main air line is greater than the pressure in the control chamber, means including second valve means for connecting the second auxiliary air reservoir with said brake cylinder, said second valve means being actuated to its open position by said valve piston during rapid braking operation when the pressure in said control chamber is greater than the pressure in said first chamber and the main air line.

2. In a single release air brake as claimed in claim 1 wherein said control piston has an axial stem thereon projecting through said control chamber and operatively engageable with said first valve means, an abutment coupling between said control piston and said valve piston, said valve piston being displaceable within said unit and engageable by said control piston through said abutment coupling, a second axial stem extending from said valve piston, said second valve means being operatively engaged by said second axial stem and resiliently biased into a closed position against said second stem by spring means whereby displacement of said valve piston opens said second valve mean.

3. In a single release air brake as claimed in claim 2 wherein said means connecting said control chamber to said second auxiliary reservoir includes a check valve, said second valve means being positioned in a direct connection to the brake cylinder.

4. In a single release air brake as claimed in claim 1 and comprising means including throttle means and a first check valve therein for connecting the main air line to the second auxiliary air reservoir, a shut-off valve in said regulating valve and actuated thereby to the open position when the regulating valve is in the brake release position, a second check valve serially connected to said shut-off valve and opening to the main air line, and a third check valve serially connected to said shut-off valve and opening to the first auxiliary air reservoir.

References Cited
UNITED STATES PATENTS 2,939,746    6/1960    Pickert  ------------  303—70
3,472,561   10/1969    Washbourn  --------  303—81 X DUANE A. REGER, Primary Examiner U.S. Cl. X.R.

303—37, 85